United States Patent [19]

Dattilo

[11] Patent Number: 4,567,421
[45] Date of Patent: Jan. 28, 1986

[54] BATTERY DISCONNECT SENSING CIRCUIT FOR BATTERY CHARGING SYSTEMS

[76] Inventor: Donald P. Dattilo, 11621 Electron Dr., Louisville, Ky. 40299

[21] Appl. No.: 539,385

[22] Filed: Oct. 6, 1983

[51] Int. Cl.[4] .............................. H02J 7/00; H02J 7/10
[52] U.S. Cl. .......................................... 320/30; 320/40; 320/47
[58] Field of Search ......................... 320/30, 39, 40, 47

[56] References Cited

U.S. PATENT DOCUMENTS 3,895,282  7/1975  Foster et al. ........................ 320/39 X
4,383,212  5/1983  Ballman ............................. 320/39 X Primary Examiner—R. J. Hickey
Attorney, Agent, or Firm—Diller, Ramik & Wight

[57] ABSTRACT

The inverting and non-inverting input terminals of a voltage comparator are connected across the cables of a battery charging system through R-C circuits having substantially different time constants. When the cables are disconnected from a battery being charged, the rapid increase in output voltage of the charging system momentarily reverses the relative values of voltage at the comparator inputs and produces a control signal which automatically deenergizes the battery charging system.

10 Claims, 2 Drawing Figures

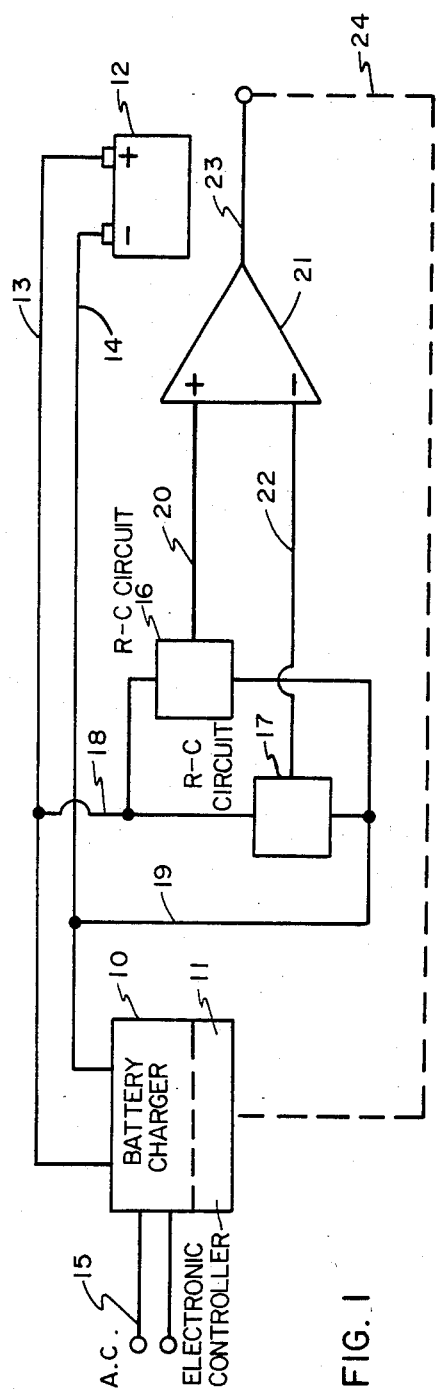
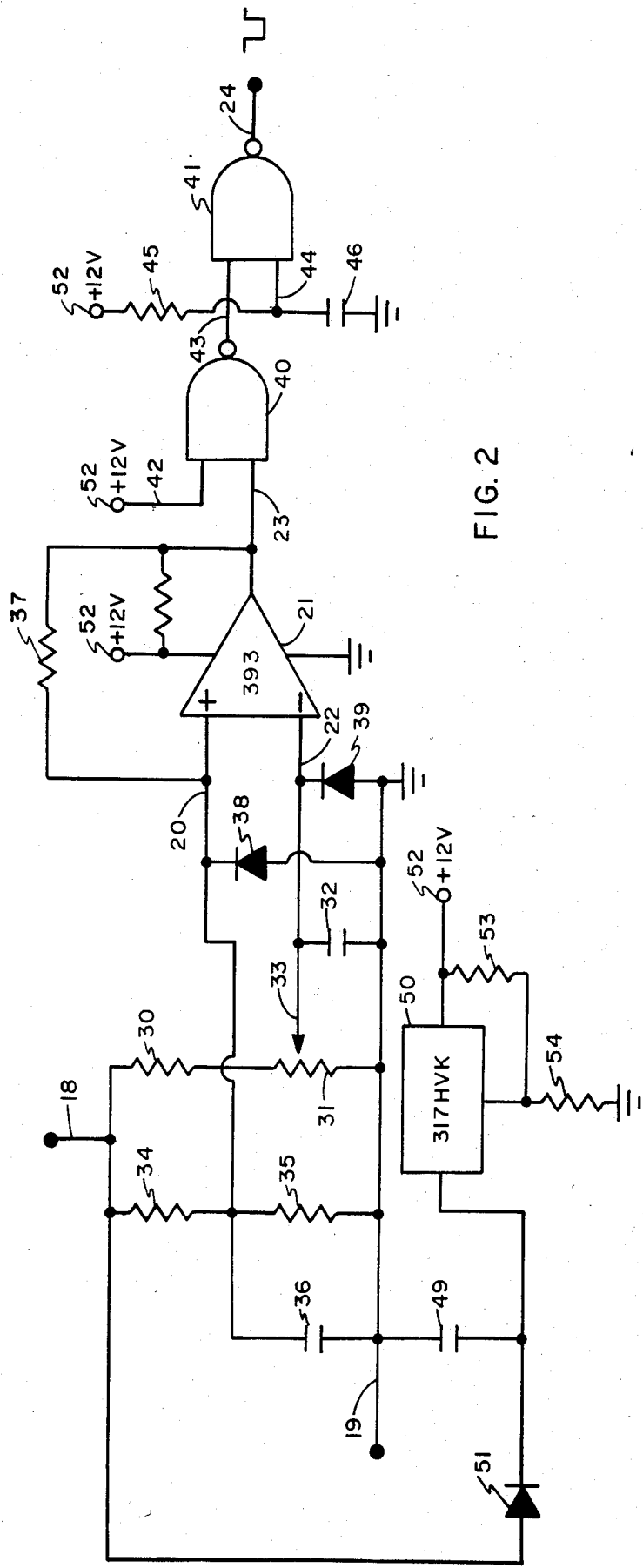
FIG. 1
FIG. 2

BATTERY DISCONNECT SENSING CIRCUIT FOR BATTERY CHARGING SYSTEMS

BACKGROUND OF THE INVENTION

In the battery industry, every battery charger uses some type of control to determine the length of charge. The first controls were simple mechanical timers operating as an on-off switch. As the use of battery powered equipment increased, more attention was given to the safety factors involved during charging. Electronic controllers were designed that mounted inside the charger to solve some of the problems.

Today, all electronic controllers use the current from the battery (to be charged) as their source of power to activate the controller which energizes a relay that turns on the charger. The current to the controller is supplied through the cables that connect the charger to the battery. Once the controller is activated the DC output from the charger is fed to the battery through the same cables. As a result, the controller will continue to receive power (from the charger output) when the battery is disconnected from the charger. The end result is that the charger remains on even though it has been disconnected from the battery. The disconnected cables from the charger thus remain "hot" until the controller is manually reset. This condition of having "hot" charger cables has damaged many systems and has caused serious injuries.

It is the purpose of this invention to provide a circuit, that when added to electronic controllers, will automatically turn off the charger when the battery is disconnected from the charger.

BRIEF SUMMARY OF THE INVENTION

Basically, the invention involves the use of a voltage comparator producing a discrete output signal when the relative values of the voltages applied to its inverting and non-inverting input terminals are reversed, and the provision of circuit means for momentarily affecting such reversal in response to disconnection of the battery charging system from the battery being charged.

The circuit means comprises two R-C circuits which have substantially different time constants. In this way, the sudden increase in charger system output voltage which occurs as a natural consequence of disconnection from the battery being charged is sensed and employed to deenergize or turn off the battery charging system.

The battery disconnect sensing circuit is itself energized in response to energization of the battery charging system. As a consequence, the voltage comparator of the sensing circuit would produce its output signal in response to such energization of the battery charging system. To eliminate this problem, the voltage comparator drives a gate means which prevents the production of a control signal when the sensing circuit is energized.

BRIEF DESCRIPTION OF THE DRAWING FIGURES

FIG. 1 is a diagram illustrating the principles of the invention; and

FIG. 2 is a circuit diagram of a preferred embodiment of the battery disconnect sensing circuit.

DETAILED DESCRIPTION OF THE INVENTION

With reference to FIG. 1, a conventional battery charger is indicated at 10 and includes an electronic controller portion 11 which responds to current from the battery 12 when the cables 13 and 14 are connected, to turn on or energize the charger 10 from the AC source 15. Conventionally, the energizing circuit connection is made through a relay controlled by the controller 11. An example of such a charging unit is the system-1,000 manufactured by Exide Corporation of Horsham, Pa.

When the cables 13, 14, are connected, the battery 12 acts as a very large capacitive load which reduces the output voltage of the charger 10 during charging. The output voltage level is held at a value which is less than that which prevails when the battery is disconnected from the cables 13, 14. Thus, when the cables are disconnected, a sudden voltage increase appears at the cables and it is this voltage jump which is sensed by the circuitry of this invention and employed to signal the controller 11 to disconnect the charger 10 from the AC source 15.

Thus, as is shown in FIG. 1, two R-C circuits 16, 17, are connected in parallel across the cables 13, 14, as indicated by the conductors 18 and 19. Under steady state or gradually changing voltage output conditions at the cables 13, 14, the circuit 16 provides a first voltage at its terminal 20 which is connected to the non-inverting input terminal of the voltage comparator 21, whereas the circuit 17 provides a second voltage of a lower potential at its terminal 22 which is applied to the inverting input of the comparator 21. Normally, the voltage level at terminal, 20, is higher than the voltage at terminal 22, but due to the difference in time constants of the two circuits 16, 17, this condition is momentarily reversed when the cables 13, 14 are disconnected and the output voltage of the charger jumps as described above.

As a consequence, a signal is produced at the output terminal 23 of the comparator 21 to signal the controller 11 to deenergize the charger 10, as symbolically illustrated by the dashed line 24 in FIG. 1.

A preferred embodiment of the battery disconnect sensing circuit is shown in FIG. 2. As will be seen, the R-C circuit identified at 17 in FIG. 1 comprises the two resistors 30 and 31 connected across the cables 13, 14, through the conductors 18, 19, and the capacitor 32 connected between the movable tap 33 of the resistor 31 and the ground conductor 19. The R-C circuit identified as 16 in FIG. 1 comprises the two resistors 34 and 35 connected in parallel with the resistors 30, 31, and the capacitor 36 connected to the junction of the resistors 34, 35, and to the ground conductor 19.

The component values of these two R-C circuits are as follows:

| | |
|---|---|
| 30,34 | 13K ohms |
| 31,35 | 1K ohms |
| 32 | 100 microfarads |
| 36 | 1000 microfarads |

The two R-C circuits function as voltage divider networks in which the voltage at the conductor 20 is higher than the voltage at conductor 22. However, if the voltage across the cables 13, 14, increases rapidly as will be the case either when the connection is first made to the battery 12 (causing the controller 11 to energize the charge 10) or when disconnection is effected, the time constant of 34, 36, being much larger than that of the other R-C circuit will cause the aforesaid relative voltages at the conductors 20, 22, to be reversed momentarily.

The movable tap 33 is positioned so that under steady state conditions the voltage at the inverting input of the voltage comparator 21 is sufficiently lower than that at the non-inverting input of the comparator to assure a "high" signal at the output 23 of the comparator. Thus, under steady state and gradually changing conditions, the two R-C circuits function simply as voltage dividing networks.

The output 23 of the comparator 21 is connected to the non-inverting input at 20 through the resistor 37 so as to provide hysterisis and speed up the switching process when the voltage at the input 22 exceeds that at the input 20. The diodes 38 and 39 are provided to protect the comparator 21 against negative voltage transitions.

The momentary signal produced by switching at the output 23 of the comparator 21 is applied to gating means which comprises the two NAND gates 40 and 41. One of the inputs of gate 40 is provided with a "high" input at 42, the other input receives its signal from comparator 21 through conductor 23. The output of this gate, at 43, is connected to one input of the gate 41. The other input 44 to the gate 41 is taken at the junction between the resistor 45 and the capacitor 46. The gating means prevents a control signal from appearing at the output 24 when the charger 10 is energized (i.e., when the connection is first made to the battery) but allows such control signal to appear when battery disconnect is effected.

This function is preferably achieved through the DC source which powers the components 21, 40, and 41. Since the battery charging source output across the cables 13, 14, is a rectified AC voltage, the DC source includes the filter capacitor 49 to smooth the voltage input to the voltage regulator 50. The diode 51 is provided for reverse polarity protection of the regulator 50. The regulator 50 is a type 317 and its voltage output at 52 is adjusted to twelve volts by the resistors 53 and 54.

When the cables 13, 14, are connected to the battery charging source 10 is energized, the time delay effected by the resistor/capacitor combination 45, 46, is sufficient to disable the gate 41 long enough for the voltage at the input 20 of the comparator 21 to rise to its normally high level (higher than the level at 22). For this purpose, the resistor 45 is chosen to have a value of 2 megohms whereas the value of the capacitor 46 is 15 microfarads providing a time delay of approximately 30 seconds.

It should be noted that the R-C circuits, comprised of resistors 30, 31, 34, 35, and capacitors, 32 and 36, perform several functions. First, the resistive portions form the correct voltage divisions to provide the proper voltages at the inputs to the comparator during charging, i.e., under steady state or gradually changing conditions where voltage across the cables 13, 14, is, at most, slowly varying. Second, the capacitive portions perform filtering functions which tend to minimize slowly varying voltage fluctuations. Lastly, the capacitive and resistive portions together perform the important function of allowing voltage differential reversal at the inputs to the comparator during sudden voltage surges at the cable 13, 14, such as when battery disconnect is effected.

What is claimed is:

1. A battery disconnect sensing circuit for battery charging systems having a pair of cables adapted to be connected to a battery to charge it, said sensing circuit comprising a first R-C circuit adapted to connect across said cables, a second R-C circuit adapted to connect across said cables, the time constant of said first R-C circuit being substantially greater than that of said second RC circuit, and means connected to said RC circuits for producing a momentary control signal in response to disconnection of said cables from a battery being charged.

2. A battery disconnect sensing circuit as defined in claim 1 wherein said means comprises a voltage comparator having an output terminal, gating means connected to said output terminal, and power-up time delay means connected to said gating means for disabling production of said momentary control signal during initial energization of said sensing circuit.

3. A battery disconnect sensing circuit for battery charging systems comprising first and second voltage dividers connected in parallel and adapted to be connected across the voltage output of a battery charging system, said first voltage divider having a first output terminal and said second voltage divider having a second output terminal in which, under steady state or gradually changing voltage conditions supplied to said voltage dividers, the voltage value at said first terminal is greater than that at said second terminal, voltage comparator means connected to said first and second terminals for producing a control signal in response to a voltage value at said second terminal signal exceeding that at said first terminal, and circuit means connected to said terminals for causing the voltage value at said second terminal to momentarily exceed that at said first terminal in response to a rapid increase in voltage value supplied to said voltage dividers.

4. A battery disconnect sensing circuit for battery charging systems as defined in claim 3 wherein said circuit means includes a first capacitor connected to said first terminal and a second capacitor connected to said second terminal, the value of said first capacitor being substantially greater than that of said second capacitor.

5. A battery disconnect sensing circuit for battery charging systems as defined in claim 4 wherein said voltage comparator means comprises a voltage comparator having an output terminal, gating means connected to the output terminal of said voltage comparator for producing said control signal, and power-up time delay means connected to said gating means for temporarily disabling said gating means during initial energization of the sensing circuit.

6. In a battery charging system including a source of charging current whose voltage output is controlled at a predetermined value when connected to a battery and increases to a higher value when disconnected from said battery, and controller means connected with said source to activate the battery charging system automatically in response to electrical connection thereof to said battery, the improvement which comprises:

means for momentarily effecting reversal of the higher voltage value, and battery disconnect sensing means connected said charging source and to said controller means for sensing said reversed higher voltage upon disconnection of said battery charger system from said battery and for responding thereto by automatically deactivating said battery charging system.

7. In a battery charging system as defined in claim 6 where in said sensing means comprises a parallel pair of voltage dividers connected across said voltage output of said source, each voltage divider having an output terminal and one such output terminal providing a voltage value under steady state or gradually changing conditions which is higher than the voltage value at the other output terminal, voltage comparator means connected to said output terminal for causing the automatic deactivation of the battery charging system when the voltage value at said other output terminal is greater than at said one output terminal, and circuit means connected to said output terminals for sensing said voltage value at said other output terminal to momentarily exceed that at said one output terminal.

8. In a battery charging system as defined in claim 7 wherein said circuit means includes a first capacitor connected to said one output terminal and a second capacitor connected to said other output terminal, the value of said first capacitor being substantially greater than that of said second capacitor.

9. In a battery charging system as defined in claim 7 wherein said voltage comparator means comprises a voltage comparator having an output terminal, gating means connected to said output terminal of the voltage comparator, and power-up time delay means connected to said gating means for momentarily disabling said gating means during initial energization of the sensing means.

10. In a battery charging system as defined in claim 8 wherein said voltage comparator means comprises a voltage comparator having an output terminal, gating means connected to said output terminal of the voltage comparator, and power-up time delay means connected to said gating means for disabling said gating means during initial energization of the sensing means.

* * * * *